(12) United States Patent
Koszarsky

(10) Patent No.: US 6,484,014 B1
(45) Date of Patent: Nov. 19, 2002

(54) REDUCED COMPONENT FREQUENCY PLAN ARCHITECTURE FOR DUAL BAND TRANSCEIVER

(75) Inventor: Christopher Koszarsky, Holly Springs, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/273,935

(22) Filed: Mar. 22, 1999

(51) Int. Cl.[7] .................................................. H04B 1/38
(52) U.S. Cl. ........................... 455/86; 455/522; 455/260
(58) Field of Search ................................. 455/76, 78, 83, 455/84, 86, 87, 255, 258, 260, 552, 553

(56) References Cited

U.S. PATENT DOCUMENTS 5,519,885 A * 5/1996 Vaisanen ..................... 455/76
5,819,161 A * 10/1998 Saito ........................... 455/86
5,966,666 A * 10/1999 Yamaguchi et al. ........ 455/552
6,061,575 A * 5/2000 Lombardi .................... 455/552
6,208,875 B1 * 5/2001 Damgaard et al. .......... 455/552

* cited by examiner

Primary Examiner—Lester G. Kincaid
(74) Attorney, Agent, or Firm—Brinks Hofer Gilson & Lione

(57) ABSTRACT

A transceiver (100) includes a synthesizer (400, 500, 600) which includes a single phase locked loop (406) for generating both a transmit offset signal and a receive second local oscillator (LO) signal for use by the transceiver. A single voltage controlled oscillator 424 provides oscillator signals for both modes. A prescaler (428) in the phase locked loop keeps the tuning distance of the VCO small. The resulting transceiver and radio including the transceiver has reduced parts count and current drain and is smaller in size then previous equipment with the same functionality.

16 Claims, 5 Drawing Sheets

FIG. 7

| Plan # | Fvcotx | Atx | R2 tx | Foffset | Fvcorx | Arx | R2 rx | F2lo | 1stIF | 2ndIF |
|---|---|---|---|---|---|---|---|---|---|---|
| (1) | 311.04 | 648 | 81 | 155.52 | 330.48 | 459 | 81 | 110.16 | 110.24 | 80kHz |
|  | 311.04 | 8 | 1 | 155.52 | 330.48 | 17 | 3 | 110.16 | 110.24 | 80kHz |
|  | 311.04 | 8 | 1 | 155.52 | 330.48 | 17 | 3 | 110.16 | 110.28 | 120kHz |
| (2) | 311.04 | 648 | 81 | 155.52 | 329.76 | 458 | 81 | 109.92 | 110.52 | 600kHz |
|  | 311.04 | 8 | 1 | 155.52 | 329.76 | 458 | 81 | 109.92 | 110.52 | 600kHz |
|  | 311.04 | 8 | 1 | 155.52 | 331.20 | 460 | 81 | 110.40 | 110.52 | 120kHz |
| (3) | 330.48 | 17 | 2 | 165.24 | 330.48 | 17 | 3 | 110.16 | 110.24 | 80kHz |
|  | 330.48 | 17 | 2 | 165.24 | 330.48 | 17 | 3 | 110.36 | 110.36 | 200kHz |
|  | 330.48 | 17 | 2 | 165.24 | 330.48 | 17 | 3 | 110.16 | 110.28 | 120kHz |

REDUCED COMPONENT FREQUENCY PLAN ARCHITECTURE FOR DUAL BAND TRANSCEIVER

BACKGROUND OF THE INVENTION

The present invention relates generally to radio receivers and transmitters. More particularly, the present invention relates to an improved architecture for a dual band transceiver.

Dual band transceivers provide two-way radio communication on two independent frequency bands. A transceiver combines transmission circuitry and reception circuitry. Both the transmission circuitry and the reception circuitry are supplied with oscillator signals produced by a synthesizer for demodulation, modulation and other purposes.

One example of a dual band transceiver is a dual mode cellular/PCS radiotelephone. The radiotelephone operates at cellular frequencies in the 800 MHz band and at personal communication system (PCS) frequencies in the 1900 MHz band. The radiotelephone includes a dual band transceiver and associated circuitry to operate on the two bands.

In such a system, several oscillator signals are required. The receiver circuitry requires main and second local oscillator (LO) signals for both bands. The transmitter circuitry requires carrier and offset oscillator signals for both bands.

The synthesizer circuitry necessary to generate these oscillating signals has required substantial operating currents and components to implement. In portable radio equipment, such as a radiotelephone, key design goals are reduction in operating current and reduction in physical size and weight of the radio. The operating current and components needed to implement a conventional dual band transceiver are inconsistent with these design goals.

Accordingly, there is a need for a transmitter and synthesizer, which reduces parts count, physical size and operating current.

BRIEF DESCRIPTION OF THE DRAWINGS

FIG. 7 is a table showing illustrative values for the block diagram of FIG. 6.

DETAILED DESCRIPTION OF THE PRESENTLY PREFERRED EMBODIMENTS

Figure 1:
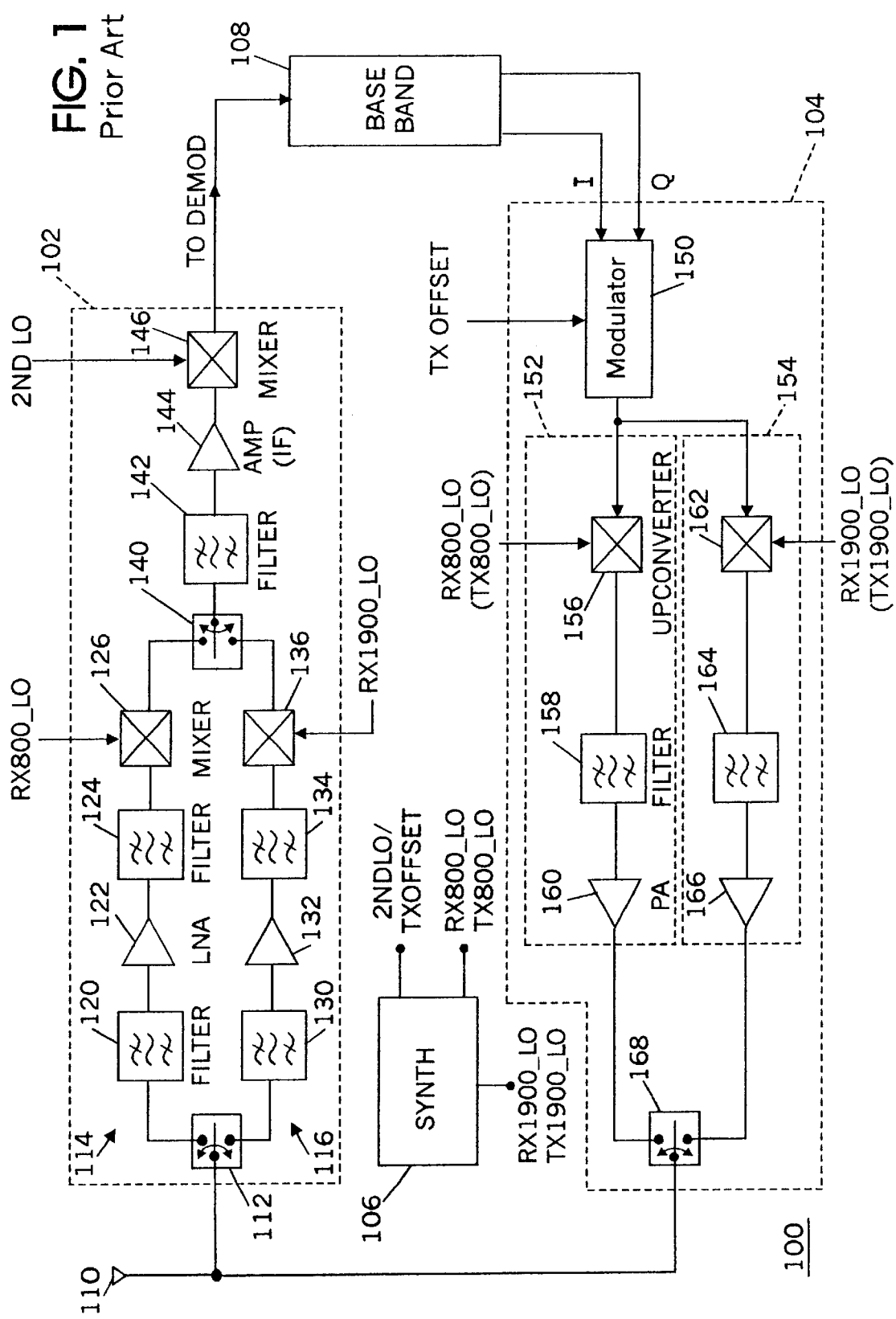
FIG. 1 is a block diagram of a conventional dual band transceiver.

Referring now to the drawing, FIG. 1 is a block diagram of a conventional dual band transceiver 100. The transceiver 100 includes a receiver 102, a transmitter 104, a synthesizer 106 and a baseband processor 108. The transceiver 100 provides two-way radio communication via an antenna 110 with a remote radio.

The transceiver 100 is configured to communicate on a first band, also referred to as a high band, and a second band, also referred to as a low band, of frequencies. In the illustrated embodiment, the first or high band corresponds to 1900 MHz and the second or low band corresponds to 800 MHz. These are. respectively, PCS and Cellular frequencies. Selection of the band of operation may be made by hardware switches, software programming, or other suitable means in response to the current operating mode of the transceiver 100.

The receiver 102 includes a band switch 112 for selecting between low-band circuitry 114 and high-band circuitry 116. The low-band circuitry 114 includes a filter 120, a low-noise amplifier 122, a filter 124, and a mixer 126. Similarly, a high-band circuitry 116 includes a filter 130. a low-noise amplifier 132, a filter 134 and a mixer 136. The receiver 102 further includes a band switch 140, a filter 142, an amplifier 144 and a mixer 146.

Operation of the components of the transceiver 100 will next be described. The band switches 112, 114 selectively include one of the low-band circuit 114 and high-band circuit 116 and the signal path from the antenna 110. Each of the filters 120, 124, 130, 134 is a bandpass filter having suitable frequency response for operation in the low-band circuit 114 and high-band circuit 116. The mixer 126 receives an oscillator signal labeled RX 800_LO in FIG. 1 and shifts the received carrier frequency down to IF. The mixer 126 is a first local oscillator (LO) which shifts the frequency of the received analog signal from the carrier frequency received at the antenna to an intermediate frequency (IF). Similarly, the mixer 136 receives an oscillator signal labeled RX 1900_LO in FIG. 1. The signal RX 800_LO serves as a first band first LO signal and the signal RX 1900_LO serves as a second band first LO signal in the receiver 102. The amplifier 144 amplifies the intermediate frequency signal and provides it to the mixer 146. Mixer 146 receives an oscillator signal labeled 2ND LO in FIG. 1. This signal corresponds to a receive second local oscillator (LO) signal. The mixer 146 serves to shift the carrier frequency from the intermediate frequency to a relatively low frequency for subsequent processing. The receiver 102 thus forms a superheterodyne receiver as is well known in the art.

The baseband processor 108 provides further processing of the receive signal. For example, the signal is demodulated and decoded to form digital data. Control data and data representative of speech are extracted from the data and used for further audio processing. The baseband processor 108 may comprise a microprocessor, digital signal processor or other suitable circuitry.

For transmission of data from the transceiver 100 to a remote radio, the baseband processor 108 performs suitable processing on the data to generate in-phase (I) and quadrature phase (Q) signals which are provided to a modulator 150 of the transmitter 104. The modulator 150 also receives an oscillator signal labeled TX offset in FIG. 1. The transmitter 104 further includes low-band circuitry 152 and high-band circuitry 154. The modulator provides a modulated signal to each of the low-band circuitry 152 and the high-band circuitry 154.

The low-band circuitry includes an up converter 156, a filter 158 and a power amplifier 160. Similarly, the high-band circuitry 154 includes an up converter 162, a filter 164 and a power amplifier 166. The output of each of the low-band circuitry 152 and the high-band circuitry 154 is coupled to a band switch 168.

The up converters 156, 162 are mixers which shift the frequency of the modulated carrier from the modulator 150 to a frequency required for a transmission via the antenna 110. The up converter 156 has a low-band circuit 152 which receives the signal RX 800_LO. The up converter 162 of the high-band circuit 154 receives the signal RX 1900_LO. The filters 158, 164 are bandpass filters which filter undesired frequencies from the carrier signal. The power amplifiers 160, 166 amplify the modulated, filtered carrier to a level sufficient to drive the antenna 110. The band switch 168 selects one of the low-band circuit 152 and the high-band circuit 154 depending on the current mode of operation.

The synthesizer 106 generates the oscillator signals required by the receiver 102 and the transmitter 104. Structure and operation of the synthesizer 106 will be described in detail below in conjunction with FIGS. 4 through 7.

Figure 2:
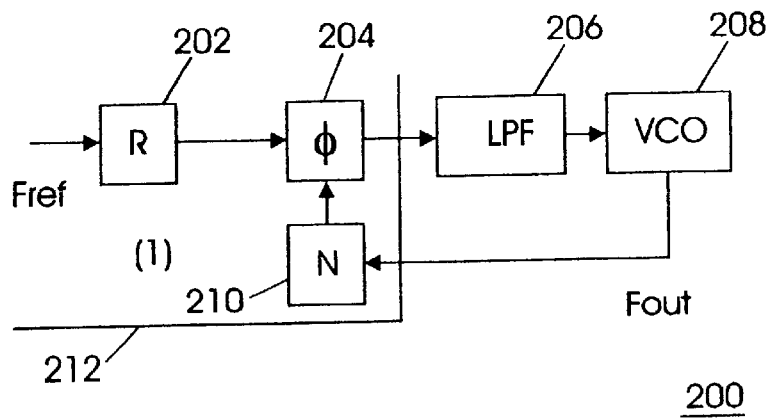
FIG. 2 is a block diagram of a conventional phased locked loop.

FIG. 2 is a block diagram of a conventional phase locked loop (PLL) 200. The PLL is used to generate oscillator signals in a synthesizer such as the synthesizer 106 of FIG. 1. The PLL 200 includes a divider 202, a phase detector 204, a low-pass filter 206, a voltage control oscillator (VCO) 208 and a divider 210. The divider 202 receives a reference signal, labeled $F_{REF}$ in FIG. 2. The reference signal is typically generated by a high precision oscillator, such as a crystal oscillator. The reference signal is received at a known frequency which is highly stable over temperature and supply voltage. The divider 202 divides the frequency of the reference signal by a programmable value R to produce a divided signal. The phase detector 204 compares the phase of a signal received from the divider 210 with the phase of the divided signal received from the divider 202. The phase detector 204 produces an error signal which is provided to the low-pass filter 206. The low-pass filter 206 operates as a loop filter and provides a correction signal to the VCO 208. In response to the correction signal, the VCO 208 varies the frequency of its output signal, labeled $F_{OUT}$ in FIG. 2. The output signal is provided to the divider 210, which divides the output signal by a programmable value N.

The structure and operation of the PLL 200 in FIG. 2 are conventional. In the illustrated embodiment, the dividers 202, 210 and the phase detector 204 are implemented in an integrated circuit 212. The integrated circuit 212 is, for example, an application specific integrated circuit or ASIC, which is employed to integrate as many semiconductor components as possible. Use of ASICs reduces overall parts count and current drain in a design. The low-pass filter 206 and the VCO 208 are implemented using discrete components, off chip from the ASIC 212.

Figure 3:
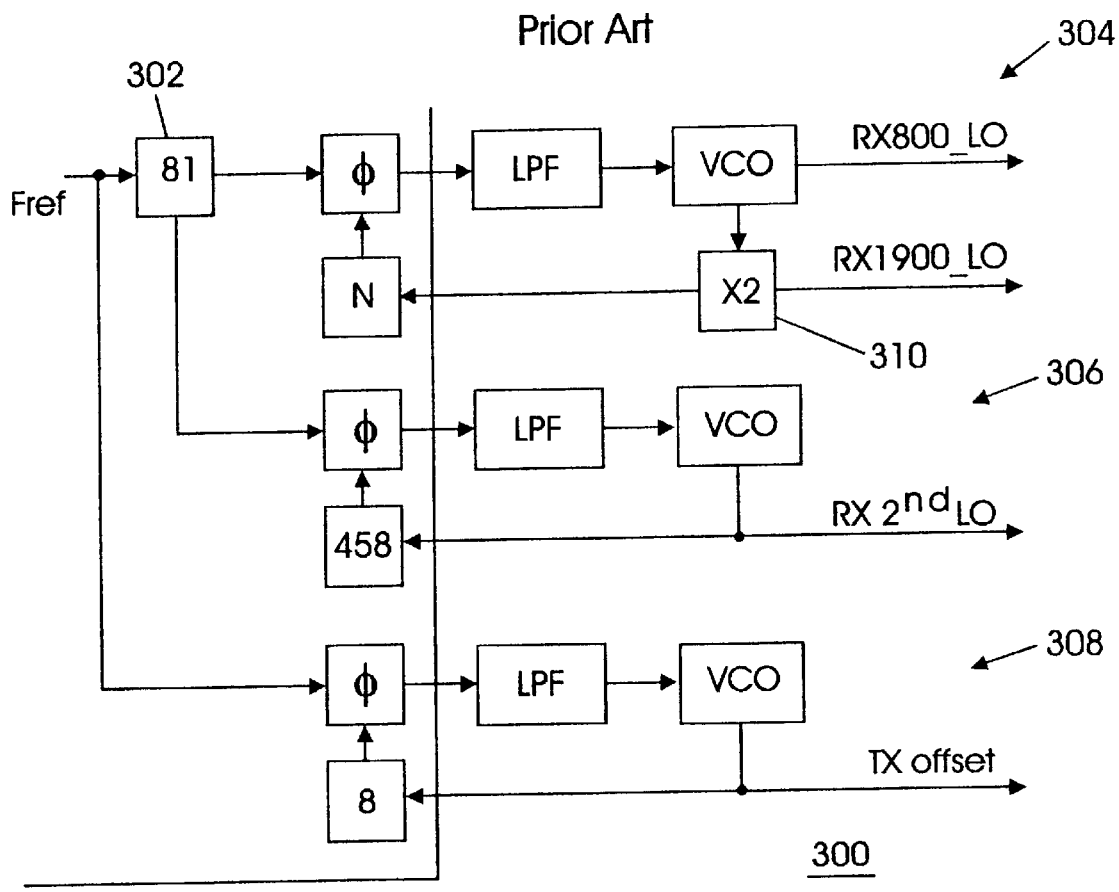
FIG. 3 is a block diagram of a conventional synthesizer.

FIG. 3 is a block diagram of a conventional synthesizer 300. The synthesizer 300 is suitable for generating the oscillator signals required by the transceiver 100 of FIG. 1. To accomplish this, the synthesizer 300 includes a divider 302 and a phase locked loop (PLL) 304, a PLL 306 and a PLL 308. Each of the PLLs 304, 306, 308 is constructed and operates like the PLL 200 illustrated in FIG. 2.

The PLL 304 generates the first local oscillator signals used in the transceiver 100. These signals are labeled RX 800_LO and RX 1900_LO in FIG. 3. The PLL 304 includes a frequency doubler 310 to produce the high-band first LO signal RX 1900_LO from the low-band first LO signal, RX 800_LO. The PLL 306 produces the second LO signal as required by the transceiver 100 (FIG. 1). The PLL 304 and the PLO 306, each are driven by the output of the dividers 302 which divides the frequency $F_{REF}$ of the reference signal by a value equal to 81 in the embodiment illustrated in FIG. 3. The PLL 308 receives the reference signal directly and produces the oscillator signal labeled TX offset in FIG. 3.

The programmable synthesizer values of N and R in the PLLs 304, 306, 308 can be set according to the desired frequency. For any given implementation, the following equation applies.

$$F_{OUT}=(N/R)F_{REF}$$

Programming necessary for the transceiver 100 of FIG. 1 includes setting R=81 for the PLL 304 and the PLL 306, setting N=458 for the PLL 306, setting R=1 and N=8 for the PLL 308, and adjusting the value of N for the PLL 304 as necessary according to the selected channel for radio communication.

Figure 4:
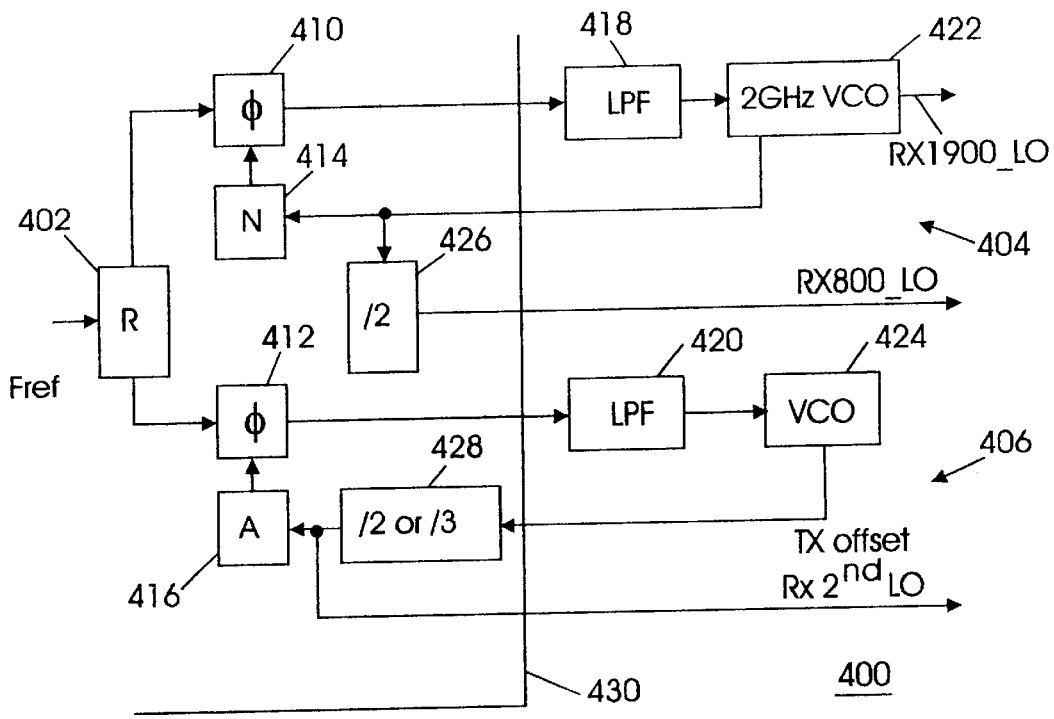
FIG. 4 is a block diagram of an improved synthesizer.

FIG. 4 is a block diagram of an improved synthesizer 400 for use in conjunction with the transceiver 100 of FIG. 1. The synthesizer 400 includes a frequency divider 402, a single phase locked loop (PLL) 406 configured to generate both a transmit offset signal and a receive second local oscillator (LO) signal, and a receive PLL 404 configured to generate a first band, first LO signal and a second band, first LO signal. The synthesizer 400 is well adapted to operate in a dual band radio operable on the 800 MHz and 1900 MHz frequency bands.

The frequency divider 402 receives a reference signal having a reference frequency labeled $F_{REF}$ in FIG. 4. The reference signal is typically generated by a high precision oscillator such as a crystal oscillator but may be generated by any suitable source. The divider 402 divides the frequency of the reference signal by a programmable value R to produce a divided signal. The divided signal is provided to the phase detector 410 and phase detector 412 of the single PLL 404 and the receive PLL 406, respectively. Each of the phase detectors 410, 412 determines a phase difference between the received divided signal and a feedback signal. In the single PLL 404 the feedback signal is provided by a divider 414 and in the receive PLL the feedback signal is provided by a divider 416. The phase detectors 410, 412 each produce a signal indicative of the detected phase difference and supply the signal to a loop filter, low pass filter 418 and low pass filter 420, respectively.

The low pass filter 418 provides a correction signal to a VCO 422. In the illustrated embodiment, the VCO 422 has a nominal frequency of 2.0 GHz and produces the signal RX1900_LO, which operates as a first band, first LO signal for the transceiver 100 (FIG. 1). The output signal from the VCO 422 is also fed to a divider 426 which divides the frequency of the signal by 2 to produce the signal RX800_LO, which operates as a second band, first LO signal for the transceiver 100 of FIG. 1. The output signal from the VCO 422 is also fed back to the divider 414 which divides the frequency by a programmable value N for comparison in the phase detector 410.

The low pass filter 420 provides a correction signal to a VCO 424. In the illustrated embodiment, the VCO 424 has a nominal frequency of 1.0 GHz. The output signal of the VCO 424 is provided to a prescaler 428.

The prescaler 428 is operable in one of a first mode and a second mode. The first mode corresponds to a receive mode and the second mode corresponds to a transmit mode for the dual band transceiver 100 of FIG. 1. The prescaler 428 is configured to divide the frequency of an oscillator signal, the output signal of the VCO 424, by a first value in the first mode. The prescaler 428 is configured to divide the frequency of the oscillator signal by a second value in the second mode. In the illustrated embodiment, in receive mode, the prescaler 428 divides the oscillator frequency by 3 and in the transmit mode, the presecaler 428 divides the oscillator frequency by 2. The prescaler 428 may be made using any suitable programmable prescaler design known in the art. The prescaler 428 receives a control signal at a control input (not shown) to control its mode of operation.

The output signal from the prescaler 428 forms the transmission offset signal, labelled TX offset in FIG. 2, in the transmit mode. The output signal from the prescaler 428 forms the receive second LO signal, labelled RX 2ND LO in FIG. 2, in the receive mode. The output signal from the prescaler 428 is also fed back to the divider 416 where its frequency is divided by a value A and provided to the phase detector 412.

The synthesizer 400 is particularly well suited for use with a transceiver in a time domain, multiple access (TDMA) radio communication system. In a TDMA system, communication is divided up into a number of time slots which are assigned to radios in the system for their sole use for transmission and receptions. A radio such as a radio including the transceiver 1 00 of FIG. 1 will never transmit and receive at the same time. It's assigned receive and transmit time slots do not overlap.

Since the transmitter and receiver of the transceiver do not have to be tune on channel at the same time, the single VCO 424 can be used to generate frequencies for both the transmit offset signal and the receive second LO signal, as is illustrated in FIG. 2. In one implementation, in transmit mode with the prescaler 428 set to divide by two, the synthesizer 400 is programmed as follows:

$F_{vcotx}$=311.04 MHz,

A=648 and

R=81.

The result is a transmit offset frequency of 155.52 MHz. Similarly, when in receive mode, the prescaler 428 is set to divide by three. In this case, $F_{vcorx}$=329.76 MHz, $A_{rx}$=458 and

R=81.

The result is a receiver second LO frequency of 109.92 MHz. Thus, there is not much difference in the VCO frequency between receive and transmit modes. This minimal difference allows the single VCO 424 to be designed with one varactor diode and a limited tuning range (small gain constant Kv). This is desirable given that the lower the tuning range of an oscillator, the better the oscillator's phase noise performance.

In another embodiment, it may be preferable to use A=8 and R=1. Lowering the value of these dividers provides the benefit of reducing phase noise in the phase locked loop. Also, using larger divider values such as R=81 produces a lower comparison frequency in the phase detectors 410 and 412. A lower comparison frequency may increase the lock time for the PLL 404, 406 which is undesirable.

The synthesizer 400 as illustrated in FIG. 4 is fabricated using an ASIC 430 and associated discrete components. The ASIC 430 is well suited to implement logic circuits used to form the phase detectors 410, 412, dividers 402, 414, 416, 426 and prescaler 428. The low pass filters 418, 420 and VCOs 422, 424 are fabricated from discrete components.

However, because the improved synthesizer 400 uses only a single low pass filter and VCO to generate both the transmit offset signal and the receive second LO signal, the total number of discrete components is reduced. In one implementation, the conventional synthesizer 300 of FIG. 3 required 35 passive components and drew 39 mA of current. In contrast, one embodiment of the improved synthesizer 400 of FIG. 4 requires only 23 passive components and 29 mA. The reduction in passive components is important because of the large amount of space on a printed circuit (PC) board they require. Reducing the number of passive components reduces this real estate and therefore reduces the size of the PC board and the size of the radio implementing the synthesizer. Reducing the current drain is important because many radios such as radiotelephones are battery powered, and reducing the current drain increases battery life.

The improved synthesizer 400 of FIG. 4 achieves the same performance as the conventional synthesizer 300 of FIG. 3, including providing the same frequencies to the transceiver 100 of FIG. 1. However, the improved synthesizer 400 can be used to provide a wide range of transmit offset, receiver second LO and main LO frequency choices other than those required by the transceiver 100.

Figure 5:
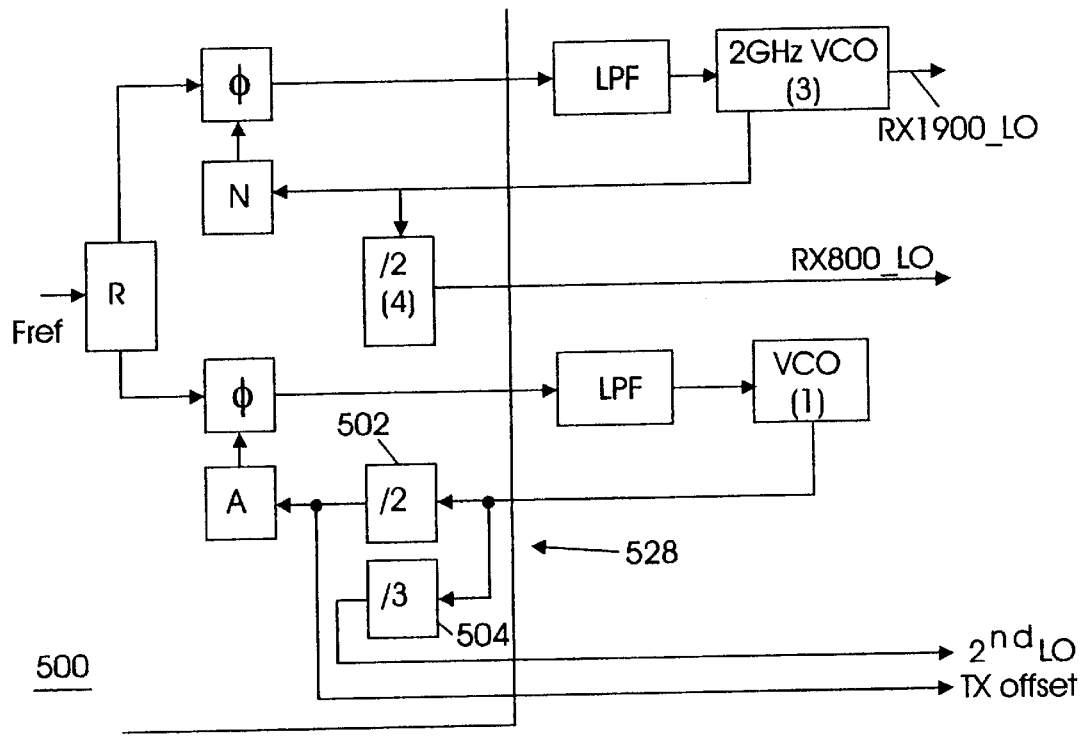
FIG. 5 is a block diagram of a second embodiment of an improved synthesizer.

FIG. 5 is a block diagram of a second embodiment of a synthesizer 500. Structure and operation of the synthesizer 400 is similar to that for the synthesizer 400 of FIG. 4. However, the synthesizer 500 includes a prescaler 528 which is formed from a divide by two prescaler 502 and a divide by three prescaler 504. In the synthesizer 400, the prescaler 428 is programmable in that a control signal controls the mode of the prescaler 428.

The prescaler 528 simultaneously generates the receive second LO signal and the transmit offset signal for the transceiver 100 of FIG. 1. The divide by two prescaler 502 generates the transmit offset signal and the divide by three prescaler 504 generates the receive second LO signal. Thus, the transmitter and receiver of the transceiver 100 may be operated simultaneously.

The embodiment of the synthesizer 500 illustrated in FIG. 5 is particularly well adapted to use in what is termed a tri-mode dual band radiotelephone. The dual band transceiver 100 of FIG. 1 can be operated at both 800 MHz and 1900 MHz. This is suited for operation with a digital advanced mobile phone system (DAMPS), for example, according to EIA/TIA standard IS-136. In such a system, the radio does not transmit and receive at the same time. However, DAMPS systems are not present in all locations. For compatibility, the radio may need to operate on the advanced mobile phone system (AMPS) of EIA/TIA standard IS90 and IS-91. Such a radio is a tri-mode dual band radiotelephone. In an AMPS radio, the receiver and the transmitter must operate at the same time.

The embodiment in FIG. 5 of synthesizer 500 permits tri mode operation. Since the prescaler 528 is implemented as two independent prescalers, prescaler 502 and prescaler 504, each independent prescaler may operate at the same time. Therefore, the transmitter and the receiver of the transceiver 100 may be operated at the same time for AMPS compatibility. While the prescalers 502, 504 are described as being divide by two and divide by three prescalers, respectively, any suitable divisor may be used. Also, any suitable divider design may be used to implement the prescalers.

The prescaler 502 and the prescaler 504 are preferably implemented on an ASIC, which permits high levels of integration and relatively low current dissipation. Therefore, no additional passive components or current drain are required relative to the embodiment of FIG. 4 and the benefits of that implementation apply to the embodiment of FIG. 5, as well.

Figure 6:
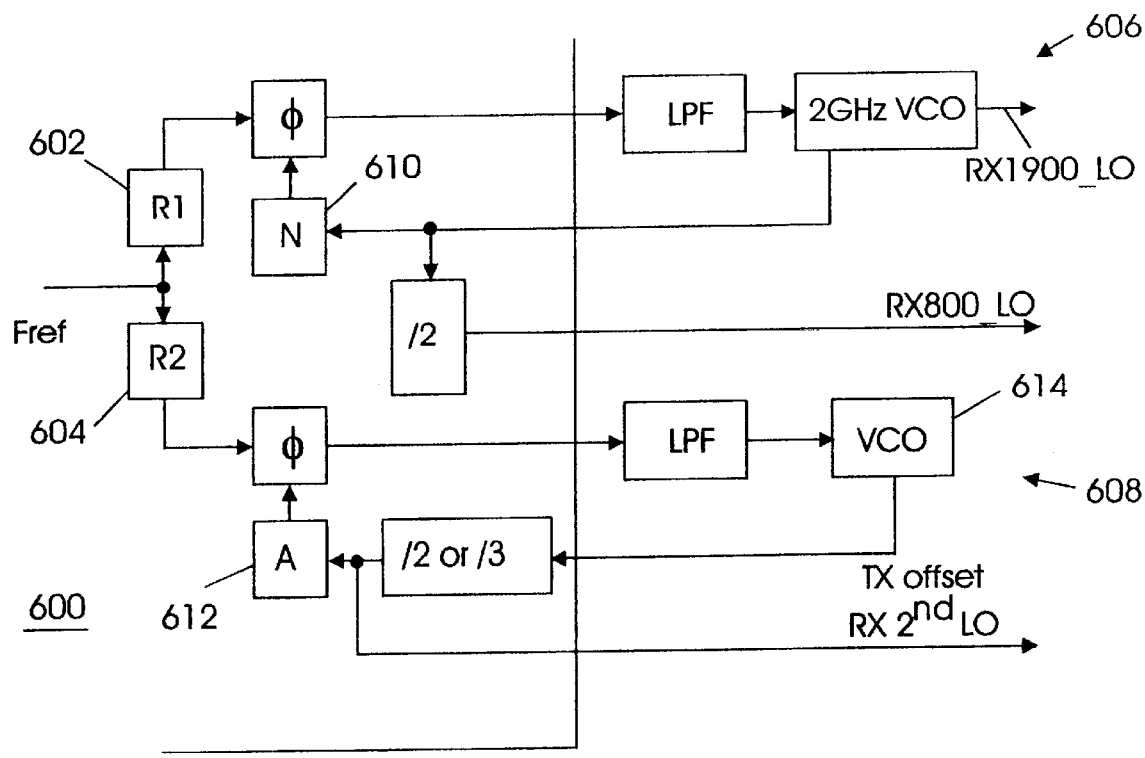
FIG. 6 is a block diagram of a third embodiment of an improved synthesizer.

FIG. 6 illustrates a third embodiment of a synthesizer 600. The synthesizer 600 makes frequency planning more flexible. In the synthesizer 600, the divider 402 of synthesizer 300 (FIG. 3) is replaced by two dividers 602, 604. The divider 602 receives the reference signal having frequency $F_{REF}$ and divides the frequency by a value R1 to produce a first divided signal. The first divided signal is provided to receive phase locked loop (PLL) 606. The receive PLL 606 includes a programmable divider 610 and generates the RX1900_LO signal and the RX800_LO signal. Similarly, the divider 604 receives the reference frequency and divides the frequency $F_{REF}$ by a value R2 to produce a second divided signal. The second divided signal is provided to single PLL 608. The single PLL 608 includes a programmable divider 612 and generates both the transmit offset signal and the receive second LO signal based on the mode of operation. The divisors for the dividers 602, 604, 610, 612 may be programmed as appropriate.

FIG. 7 is a table showing illustrative values for the dividers of the synthesizer 600 of FIG. 6. In FIG. 7, $F_{vcotx}$ is the frequency of the oscillator signal from the VCO 614 of the single PLL 608 in transmit mode; $A_{tx}$ is the value of the divider 612 in transmit mode; $R2_{tx}$ is the value of divider 604 in transmit mode; $F_{offset}$ is the value of the transmit offset frequency; $F_{vcorx}$ is the frequency of the oscillator signal from the VCO 614 of the single PLL 608 in receive mode; $A_{rx}$ is the value of the divider 612 in receive mode; $R2_{rx}$ is the value of divider 604 in receive mode; $F_{2lo}$ is the frequency of the receive second local oscillator signal; 1stIF is the frequency of the intermediate frequency signal after mixing in the first LO in the transceiver 100; and 2ndIF is the frequency of the IF signal after mixing in the second LO in the transceiver 100. These values are exemplary only. Other suitable values may be used as well.

Figure 8:
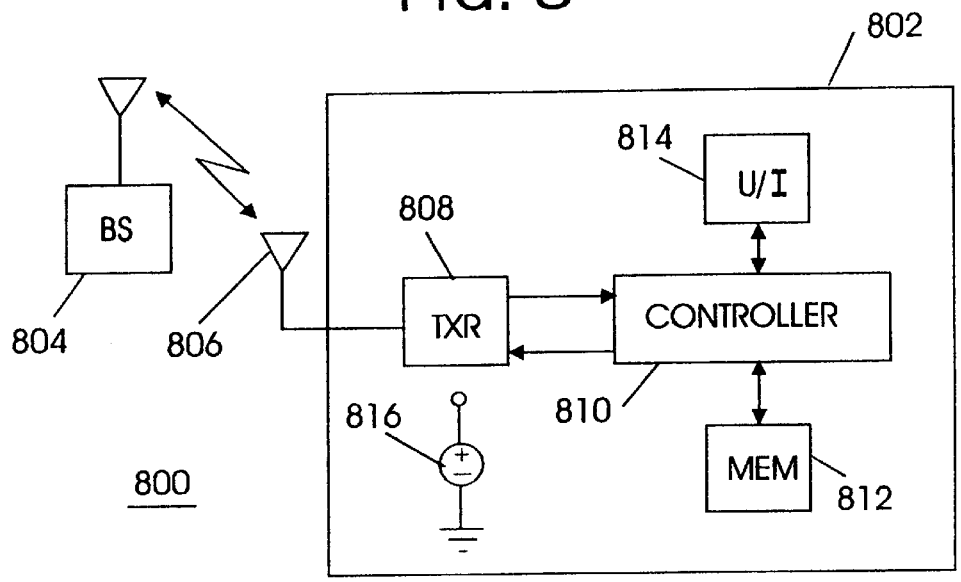
FIG. 8 is a block diagram of a radiotelephone.

FIG. 8 is a block diagram of a radiotelephone system 800. The system 800 includes a radiotelephone 802 in two way radio communication with a remote radio at a base station 804. The system 800 may be any suitable telecommunication system and in one embodiment is a TDMA DAMPS cellular telephone system.

The radiotelephone 802 is this embodiment is a dual band DAMPS cellular telephone. The radiotelephone 802 includes an antenna 806, a transceiver 808, a controller 810, a memory 812 and a user interface 814. Operating power for the radiotelephone 802 is provided by a battery 816.

The transceiver 808 provides two way radio communication with the base station 804. In the illustrated embodiment, the transceiver 808 comprises the transceiver 100 of FIG. 1 and a synthesizer such as synthesizer 400, 500, 600 as illustrated in FIGS. 4, 5 and 6 respectively. The controller 810 provides baseband processing and controls operation of the radiotelephone 802 in response to instructions and data stored in the memory 812. The user interface 814 permits user control of the radiotelephone 802. The user interface in a typical embodiment includes a display, a keypad, a microphone and a speaker.

From the foregoing, it can be seen that the present invention provides a dual band transmitter and synthesizer offering reduced parts count, smaller physical size and reduced operating current. Since a TDMA radio does not need to transmit and receive at the same time, the function of generating the transmit offset and receive second local oscillator signals can be combined into a single PLL. Even where these signals are required simultaneously, they can be provided by including two independent prescalers to generate the necessary frequencies.

While a particular embodiment of the present invention has been shown and described, modifications may be made. For example, any combination of integrated circuits and discrete components and any combination of hardware and software can be used to implement the disclosed embodiments. It is therefore intended in the appended claims to cover all such changes and modifications which follow in the true spirit and scope of the invention.

What is claimed is:

1. A synthesizer for a dual band transceiver, the synthesizer comprising:

a single phase locked loop (PLL) configured to generate both a transmit offset signal and a receive second local oscillator (LO) signal; and a receive PLL configured to generate a first band first LO signal and a second band first LO signal;

wherein the single PLL further comprises an oscillator, an output, and a prescaler operably connected between the oscillator and the output.

2. The synthesizer of claim 1 wherein the prescaler is operable in one of a first mode and a second mode.

3. The synthesizer of claim 2 wherein the prescaler comprises a divide by 2 prescaler and a divide by 3 prescaler for generating the transmit offset signal and the receive second LO signal.

4. The synthesizer of claim 2 wherein the prescaler comprises a programmable prescaler configured to divide an oscillator frequency by a first value in the first mode and to divide the oscillator frequency by a second value in the second mode.

5. The synthesizer of claim 2 wherein the first mode corresponds to a receive mode and the second mode corresponds to a transmit mode for the dual band transceiver, and wherein the prescaler is configured to divide an oscillator frequency by a first value in the first mode and the prescaler is configured to divide the oscillator frequency by a second value in the second mode.

6. The synthesizer of claim 1 wherein the receive PLL comprises a PLL configured to generate the first band first LO signal and a divider coupled to the PLL to produce the second band first LO signal in response to the first band first LO signal.

7. The synthesizer of claim 1 further comprising a divider configured to divide a reference signal and produce a divided signal, the single PLL and the receive PLL being coupled to the divider to receive the divided signal.

8. The synthesizer of claim 1 further comprising a first divider configured to divide a reference signal and produce a first divided signal and a second divider configured to divide the reference signal and produce a second divided signal, the single PLL being coupled to the first divider to receive the first divided signal and the receive PLL being coupled to the second divider to receive the second divided signal.

9. A transceiver for a dual band, time division multiple access (TDMA) radio, the transceiver comprising:

a receiver;

a transmitter; and a synthesizer including:

a single phase locked loop (PLL) coupled to the transmitter and the receiver and configured to generate both a transmit offset signal and a receive second local oscillator (LO) signal, and a receive PLL coupled to the receiver and configured to generate a high band first LO signal and a low band first LO signal;

wherein the single PLL further comprises an oscillator, an output, and a prescaler operably connected between the oscillator and the output.

10. The transceiver of claim 9 wherein the receiver is configured to receive during first time slots and the transmitter is configured to transmit during second time slots, and wherein the single PLL generates the receive second LO signal during the first time slots and generates the transmit offset signal during the second time slots.

11. A method for operating a transceiver in a two-way time division multiple access (TDMA) radio system, the method comprising the steps of:

(a) dividing a reference frequency to produce a divided signal; and (b) in response to the divided signal, using a single phase locked loop (PLL), during the first time slots generating a receive second local oscillator (LO) signal and during second time slots generating a transmit offset signal;

wherein the single PLL further comprises an oscillator, an output, and a prescaler operably connected between the oscillator and the output.

12. The method of claim 11 further comprising the step of:

(c) in response to the divided signal, producing a first band first local oscillator (LO) signal and a second band LO signal.

13. The method of claim 12 wherein step (a) comprises the steps of:

(a1) using a first divider, dividing a reference signal at the reference frequency to produce a first divided signal; and (a2) using a second divider, dividing the reference signal to produce a second divided signal.

14. The method of claim 11 wherein step (b) comprises the steps of:

(b1) generating an oscillator signal in the single PLL;

(b2) dividing the oscillator signal by a first value to produce the receive second LO signal; and (b3) dividing the oscillator signal by a second value to produce the offset signal.

15. The method of claim 11 wherein step (b) further comprises the steps of:

(b1) receiving radio frequency (RF) signals at the transceiver from a remote radio during the first time slots; and (b2) transmitting RF signals from the transceiver to the remote radio during the second time slots.

16. A transceiver for a time division multiple access (TDMA) radio, the transceiver comprising:

receiving means for receiving radio frequency (RF) signals from a remote radio;

transmitting means for transmitting radio frequency signals to the remote radio;

synthesizing means for generating oscillating signals, the synthesizing means including:

first phase locked loop (PLL) means coupled to the transmitter and the receiver for generating a transmit offset signal during transmit time slots and for generating a receive second local oscillator (LO) during receive time slots; and receive PLL means coupled to the receiver for generating a high band first LO signal and a low band first LO signal during the receive time slots;

wherein the first PLL means further comprises an oscillating means, an output, and a prescaling means operably connected between the oscillating means and the output.

* * * * *

UNITED STATES PATENT AND TRADEMARK OFFICE
CERTIFICATE OF CORRECTION

PATENT NO.   : 6,484,014 B1
DATED        : November 19, 2002
INVENTOR(S)  : Christopher Koszarsky It is certified that error appears in the above-identified patent and that said Letters Patent is hereby corrected as shown below:

Column 9,
Line 4, please delete "the".

Signed and Sealed this

Twenty-fifth Day of March, 2003

JAMES E. ROGAN
*Director of the United States Patent and Trademark Office*